J. R. SNYDER.
TRIPLE VALVE.
APPLICATION FILED AUG. 27, 1912.

1,097,059.

Patented May 19, 1914.

3 SHEETS—SHEET 1.

WITNESSES

INVENTOR

J. R. SNYDER.
TRIPLE VALVE.
APPLICATION FILED AUG. 27, 1912.

1,097,059.

Patented May 19, 1914.

3 SHEETS—SHEET 2.

WITNESSES

INVENTOR

J. R. SNYDER.
TRIPLE VALVE.
APPLICATION FILED AUG. 27, 1912.
1,097,059.
Patented May 19, 1914.
3 SHEETS—SHEET 3.
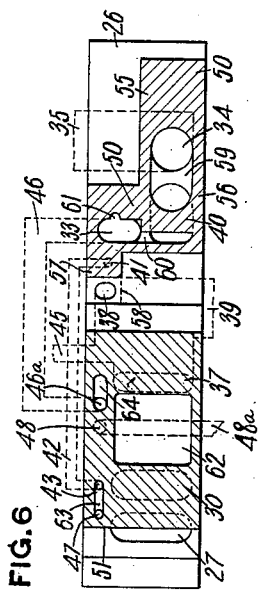
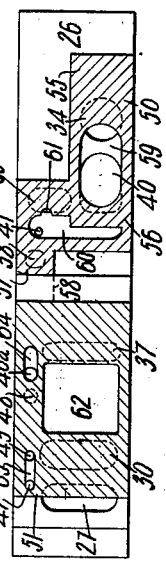
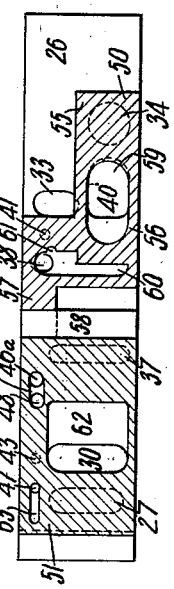
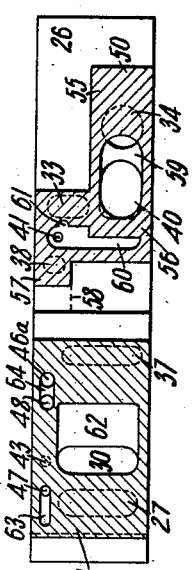
WITNESSES
INVENTOR
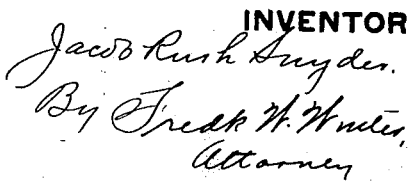

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

TRIPLE VALVE.

1,097,059.  Specification of Letters Patent.  Patented May 19, 1914.

Application filed August 27, 1912. Serial No. 717,363.

*To all whom it may concern:*

Be it known that I, JACOB RUSH SNYDER, a resident of Pittsburgh, in the county of Allegheny and State of Pennsylvania, have invented a new and useful Improvement in Triple Valves, of which the following is a specification.

This invention relates to triple valves for air brake systems and more particularly for passenger car service.

The object of the invention is to provide a triple valve having all of the usual functions of triple valves and in addition being so arranged as to produce a quick serial action of the brakes throughout the train, secure a graduated release of the brakes, and also maintain the pressure in the brake cylinder in service applications irrespective of leakage, and in its preferred form providing for emergency application by means of the usual service brake cylinder and a second or emergency brake cylinder; and which performs these various functions by a much simpler and less complicated construction than prior valves capable of effecting the same results and functions.

The invention comprises the construction and arrangement of parts hereinafter described and claimed.

Figure 1:
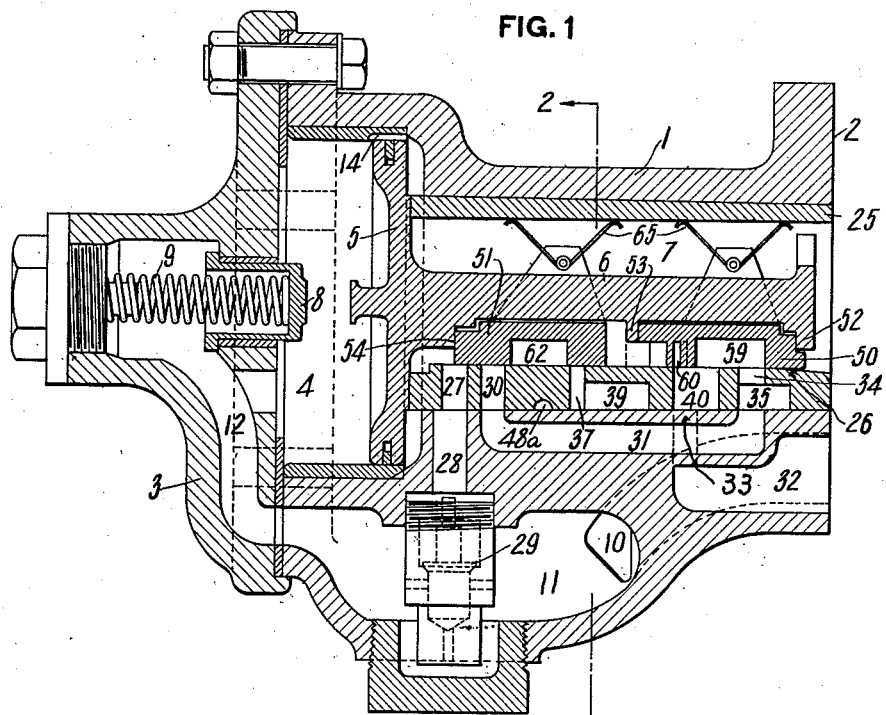
Figure 4:
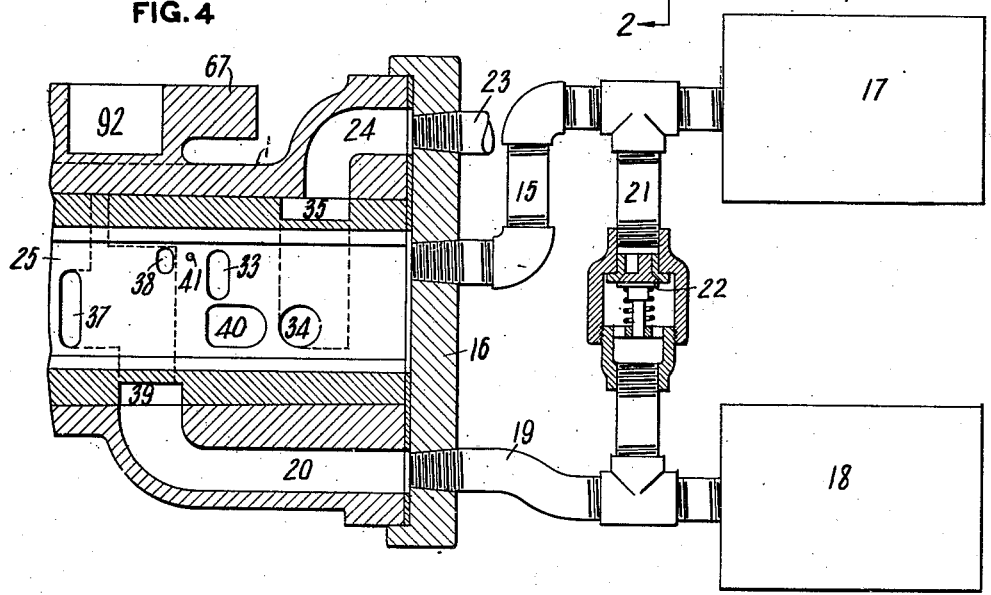
Figure 2:
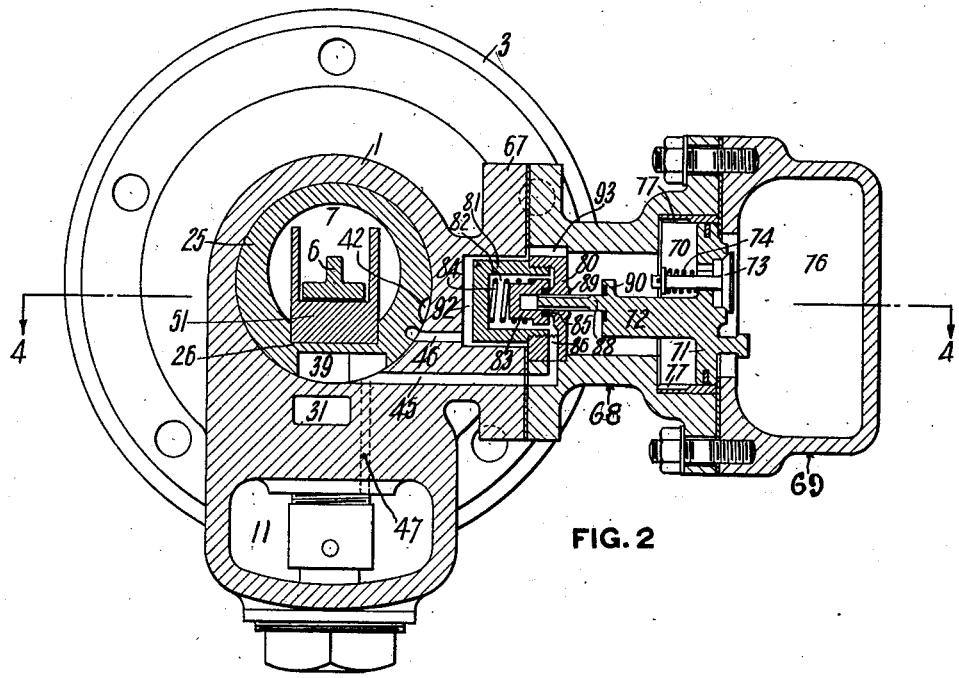
Figure 3:
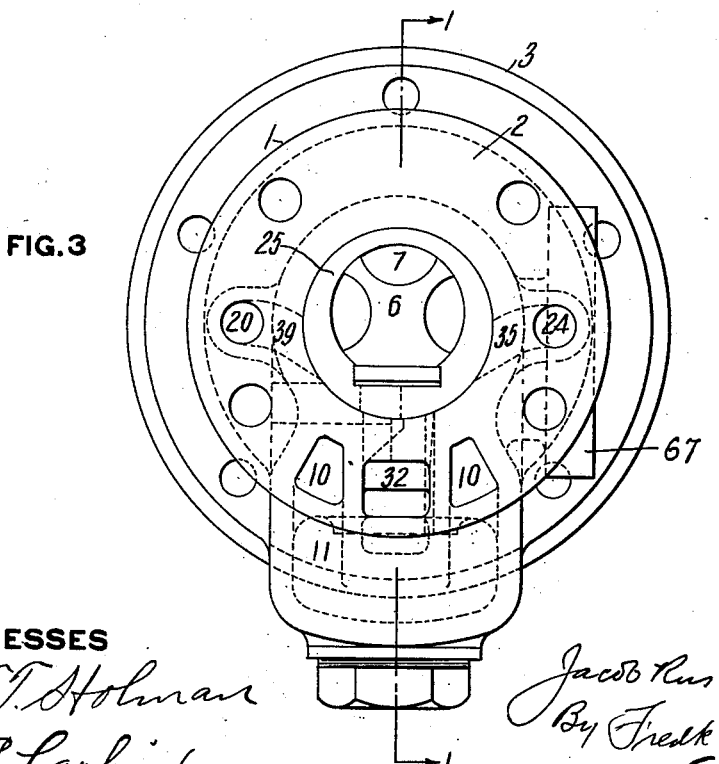

In the accompanying drawings Figure 1 is a longitudinal section through a triple valve embodying the invention taken on the line 1—1, Figs. 3 and 5; Fig. 2 is a transverse section taken substantially on the line 2—2, Fig. 1; Fig. 3 is an end view of the triple valve, the pressure maintenance valve being omitted; Fig. 4 is a horizontal section on the line 4—4, Fig. 2, some of the parts being omitted, and showing diagrammatically the connection of the auxiliary and supplemental reservoirs; Fig. 5 is a plan view of the valve seat; and Figs. 6, 7, 8, 9, 10, 11 and 12 are diagrammatic views showing the valve seat in plan and the slide valves in horizontal section and showing the different positions of the valve, Fig. 6 showing the same in full release position, Fig. 7 in quick service or quick serial application position, Fig. 8 in full service position, Fig. 9 in service lap position, Fig. 10 in graduated release position, Fig. 11 in graduated release lap position and Fig. 12 in emergency position.

The valve in its general form, construction and arrangement follows the standard type of Westinghouse and similar valves. It comprises a casing 1 provided at one end with a flat face 2 for the usual connection to the auxiliary reservoir and brake cylinder, if desired, and closed at its opposite end by the head or cap 3. In said casing is the usual chamber 4 in which works the main piston 5 which is provided with a stem 6 extending into the bore 7 of the casing and actuating the slide valves. In the head or cap 3 is the usual graduating stem 8 held by the graduating spring 9 and against which the main piston abuts when going to service and emergency application positions, as is usual in triple valves. The train or brake pipe connection is through two passages 10 extending longitudinally in the casing, one on each side of the longitudinal center of the valve, and meeting in a common passage 11 from which a passage 12 leads through the cap or head 3 and communicates with the piston chamber 4. In the bushing of piston chamber 4 is the usual charging groove 14 which is open when the valve is in full release position and through which train pipe air passes to the auxiliary reservoir 17 which is connected directly with the end of bore 7, such as by pipe 15 threaded into cap 16 closing the inner end of the valve casing. 18 represents a supplementary reservoir having a pipe connection 19 to a passage 20 in the valve casing. The auxiliary and supplementary reservoirs are connected by pipe 21 in which is a check valve 22 spring seated toward the auxiliary reservoir, so that the supplementary reservoir can be charged from the auxiliary reservoir, but air will not flow in the opposite direction. The cap 16 also has a pipe connection 23 from the emergency brake cylinder to a passage 24 in the valve casing, as well as having pipe connections (not shown) to the train pipe and service brake cylinder.

In the bore 7 is a suitable bushing 25 having its lowermost portion forming a seat 26 for the slide valves. This seat is provided with the ports and passages shown in Fig. 5, to-wit: a port 27 communicating through a vertical port 28 in the casing with the train pipe space 11, there being in said connection a check valve 29 spring seated toward the train pipe; a port 30 communicating with a passage 31 extending downwardly and thence longitudinally in the casing and communicating with the passage 35 with which the emergency brake cylinder is connected; a second port 33 communicating directly with the service brake cylinder connection 32; a port 34 communicating with the passage 35 formed in the exterior of the bushing 25 and leading to the emergency brake cylinder connection 24; a pair of ports 37 and 38 communicating with passage 39 formed in the exterior of the bushing 25 and communicating with the supplementary reservoir connection 20, a passage 45 leading from passage 39 to the pressure maintenance valve hereinafter described; a port 40 leading to the atmosphere and forming the exhaust from the valve; a small port 41 located in proximity to service brake cylinder port 33 and communicating through the passage 42 with another small port 43 in the valve seat; a small port 47 located in proximity to port 43 and communicating with the train pipe passage 11; a port 46ª communicating with passage 46 which connects with brake cylinder port 33 and leads to the pressure maintenance valve; and a port 48 communicating with passage 48ª leading to the usual blow-off or pressure reducing valve.

Coöperating with the valve seat are two slide valves 50 and 51. The slide valve 50 is held between an end projection 52 and an intermediate projection 53 on the stem 6 of the main piston so that said valve 50 at all times moves with the piston 5. The slide valve 51 is confined between the intermediate projection 53 and a shoulder 54 on the main piston stem, but does not fill the space between said projection and the shoulder so that there is a certain amount of lost motion which permits the main piston to move at times without moving the valve 51.

The slide valve 50 in plan view is of the form shown in Figs. 6 to 12, being of substantially L-shape with the longitudinal portion 55, main transverse portion 56 and a small longitudinal projecting portion 57, which may be extended in certain cases hereafter referred to, as indicated by the dotted lines 58. This valve is provided in its lower face in its longitudinal portion 55 with a large longitudinal cavity 59 and in its transverse portion 56 with the irregularly shaped transverse cavity 60 having a small longitudinal extension 61 near one end.

The slide valve 51 is of substantially rectangular form and is provided in its lower face with three cavities, to-wit: a relatively large square cavity 62 and a pair of narrow longitudinal cavities 63 and 64. The slide valves are held to the seat by the usual springs 65.

The pressure maintenance valve heretofore referred to, is secured to one side of the main casing 1, the latter being provided with a flange 67 to which is secured the flange 65 of the pressure maintenance valve which comprises a main body portion 68 and a cap 69. In the casing 68 is a suitable chamber 70 in which works a piston 71 having a stem 72 and provided with a passage therethrough which is controlled by check valve 73 opening outwardly and normally held closed by a light spring 74. In the cap 69 is a comparatively large chamber 76 which is supplied with air at the proper time through the check valve-controlled passage in the piston 71. The bushing in chamber 70 is also provided with grooves 77 which are uncovered or open when the piston is in its innermost position and serve as a means for releasing pressure from chamber 76. Between the main valve casing 1 and the maintenance valve casing 68 is a disk 80 having threaded thereto a cage 81 inclosing a chamber 82 in which is located a valve 83 normally held by spring 84 against a seat 85 surrounding an opening in the disk. The valve chamber 82 has a connection at 86 with passage 45 coming from passage 39 in the valve bushing so that at all times supplementary reservoir air is in chamber 82. The piston stem 72 is provided with an extension 88 which is fluted or grooved and extends through the opening in disk 80 and slightly into valve 83, and is so arranged that when the piston 71 moves inwardly its end contacts with valve 83 and moves said valve against the resistance of spring 84 to unseat the valve and permit air to flow from the connection 86 through the opening in disk 80 around the grooved stem 88 into valve chamber 70 and thence through passage 46 to the service brake cylinder. The opposite face of disk 80 is also provided with a valve seat 89 with which coöperates a valve 90 on the piston stem 72 when the piston moves toward its extreme inward position. The passage 46 coming from service brake cylinder port 33 communicates with a chamber 92 which has communication through port 93 with piston chamber 70.

The valve described has seven positions, as follows:

*1. Full release and recharging position.* (Shown in Figs. 1 and 6.)—In this position the main piston 5 is at its extreme forward or inward stroke so as to uncover the feeding groove 14 so that train pipe air entering the valve through passages 10 flows through passages 11 and 12 to the piston chamber 4, thence through feed groove 14 to longitudinal bore 7 of the valve and thence through connection 15 to the auxiliary reservoir 17 and from the latter through connection 21 past check valve 22 to the supplementary reservoir 18, until the pressure in the reservoir equalizes with train pipe pressure. In case the slide valve 50 is not provided with the prolongation on its extension 57 (indicated by dotted lines 58) then supplementary reservoir port 38 will be uncovered and the supplementary reservoir will be charged directly through the passages 39, 20 and pipe 19, making the connection 21 unnecessary. In case, however, the longitudinal extension 57 is prolonged as indicated by dotted lines 58, supplementary reservoir port 38 is covered and in that event the connection 21, or some other connection, is required to charge the supplementary reservoir. In this position also cavity 59 of valve 50 connects emergency brake cylinder port 34 with exhaust port 40, while transverse cavity 60 connects service brake cylinder port 33 with exhaust port 40 so that both brake cylinders are exhausted to the atmosphere. Slide valve 51 also partly uncovers train pipe port 27 which allows train pipe pressure to flow past the check valve 29 and into the bore 7 of the triple valve and thence to the auxiliary and supplementary reservoirs. The check valve 29 will remain open until the pressure in the auxiliary and supplementary reservoirs plus the tension of the spring on said check valve equalizes with the train pipe pressure, when said check valve closes and the further charging of the auxiliary and supplementary reservoirs is completed more slowly through the feed groove 14. The port 27 is of considerable area and provides for quickly charging the reservoirs on a car. All other ports are blanked. Cavity 63 in slide valve 51 connects train pipe port 47 with the small port 43, but the connected port 41 is blanked by valve 50 so that no effect is produced. As the service brake cylinder port 33 is connected with the exhaust port 40, this exhausts air from chamber 70 of the pressure maintenance valve through port 93 and passages 92 and 46. Consequently, the piston 71 moves fully over toward the left or to its inward position by the pressure in chamber 76, compressing spring 84, until the release grooves 77 are uncovered so that the pressure from chamber 76 is permitted to escape to the atmosphere. This movement unseats valve 83, but inasmuch as the piston goes fully over to the left, valve 90 seats on seat 89 and thereby closes communication from the supplementary reservoir connection 86 to the chamber 70, while the chamber 76 is being exhausted. When fully exhausted the spring 84 seats valve 83 and pushes piston 71 to normal position.

2. *Quick service or quick serial venting position.* (Shown in Fig. 7.)—This position is assumed upon the first movement of the main piston upon slight reduction of train pipe pressure and results in moving the slide valve 50 from the position shown in Fig. 6 to that shown in Fig. 7 but without moving the slide valve 51 due to the lost motion connection between the main piston and the latter valve. In this position all the ports and passages remain as before, except that feed groove 14 is blanked, supplementary reservoir port 38 is closed (even in case the extension 57 is not prolonged, as at 58) thereby trapping the air in said supplementary reservoir, the communication between the service brake cylinder port 33 and exhaust port 40 is broken, while a direct connection is made between train pipe and service brake cylinder from port 47 in the valve seat, cavity 63 in slide valve 51, port 43, passage 42, port 41, and cavity 60 and longitudinal extension 61 thereof in slide valve 50 to the service brake cylinder port 33. The result is that the train pipe is momentarily vented to the service brake cylinder which is at atmospheric pressure, thereby producing a drop in pressure in the train pipe at the car and securing quicker serial action of the brakes throughout the train. The effect is the same as though at each car the train pipe were momentarily vented to the atmosphere to secure quicker reduction of train pipe pressure toward the rear end of the train than would be possible if all the air had to flow forwardly and out at the engineer's brake valve. Instead, however, of venting the train pipe at each car to the atmosphere, it is vented into the service brake cylinder, thereby producing a light setting of the brakes. The valve remains for a brief time in this position, due to the fact that the first movement of the piston 5 moves only the slide valve 50, but as soon as the slack between the piston stem 6 and the slide valve 51 is taken up the greater frictional resistance encountered momentarily checks the movement of the piston, thereby providing an appreciable time for venting the train pipe into the service brake cylinder. The reduction of train pipe pressure caused thereby produces a sufficient unbalancing of pressures on the opposite sides of the main piston to overcome the friction of both slide valves and the valves almost immediately move to the next position, now to be described.

3. *Full service position.* (Shown in Fig. 8.)—In this position the slide valve 50 has moved over sufficiently so that it uncovers the service brake cylinder port 33 allowing auxiliary reservoir air to rush into said brake cylinder. The exhaust port 40 is blanked and the supplementary reservoir ports likewise are cut off from connection with the service brake cylinder. The slide valve 51 has moved over so that its cavity 64 connects service brake cylinder port 46ª with blow-off port 48, thereby permitting the brake cylinder pressure to be released if it exceeds the pressure to which said blow-off valve has been set. Brake cylinder air also passes through passages 46, 92 and 93 to piston chamber 70 of the pressure maintenance valve driving piston 71 outwardly and flows past check valve 73 into chamber 76 charging the latter to the same pressure as the brake cylinder. The valve 83 is seated and cuts off communication between the supplementary reservoir and chamber 70.

*4. Service lap position.* (Shown in Fig. 9.)—This position is assumed by the valve on a slight recoil, such as occurs only after a service application due to momentary unbalancing of pressures on the train pipe side of the main piston. The slide valve 51 has remained stationary, but the slide valve 50 has moved over sufficiently to blank the brake cylinder port 33, thereby cutting off further flow of air from the auxiliary reservoir to the brake cylinder. The pressure maintenance valve, however, is in the position previously described and should the brake cylinder pressure leak off appreciably, it reduces the pressure in chamber 70 thereby permitting the trapped pressure in chamber 76 to move piston 71 to the left sufficiently for its stem 88 to unseat valve 83, and permit supplementary reservoir pressure to flow from connection 86 through the opening in disk 80 and thence through passages 93, 92 and 46 to the service brake cylinder. This replenishes the service brake cylinder from the supplementary reservoir. As soon as the pressure in the service brake cylinder is brought up to the desired point it reacts in chamber 70 against piston 71, moving the same back to original position and permitting spring 84 to seat valve 83 and cut off the flow of further air from the supplementary reservoir to the service brake cylinder. As soon as the brake cylinder pressure again falls substantially, the trapped pressure in chamber 76 again moves the piston 71 to the left, unseating valve 83 as before and again permits supplementary reservoir pressure to flow to the service brake cylinder. These movements continue as long as the brake cylinder continues to leak off and results in maintaining the pressure in said brake cylinder to the desired degree, the same being replenished from the supplementary reservoir in which the pressure is still higher than in the auxiliary reservoir which has been partly equalized into the brake cylinder. When the main valve goes to full release position, the pressure in chamber 70 is entirely exhausted, so that the piston 71 under the pressure on its outer face moves fully to the left, seats valve 90 on seat 89 and uncovers grooves 77 through which the chamber 76 exhausts to the brake cylinder and to the atmosphere, so that in full release position neither side of piston 71 is subject to fluid pressure.

*5. Graduated release position.* (Shown in Fig. 10.)—This position is assumed upon a slight increase of train pipe pressure after a service application. In this position the slide valve 51 blanks the connection between the brake cylinder port 46ᵃ and blow-off valve port 48. The important change, however, is that the cavity 60 of slide valve 50 connects service brake cylinder port 33 with exhaust port 40 through a restricted passage, thereby permitting the brake cylinder to slightly vent to the atmosphere. The valve remains in this position only momentarily as the slight recoil which always occurs after movement of the valve moves the same back to break the connection between the service brake cylinder port 33 and the exhaust port 40 but by again slightly increasing the train pipe pressure, the valve 50 can be repeatedly moved to the position shown in Fig. 10 and the brake graduated off. The valve 51 also somewhat uncovers train pipe port 27, thereby permitting the auxiliary and supplementary reservoirs to be recharged in case they have fallen materially below train pipe pressure. The release of a portion of the pressure from the brake cylinder reacts in chamber 70, causing piston 71 to move inwardly and uncover release grooves 77 and permit a corresponding amount of pressure to escape from chamber 76, after which the maintenance valve acts as usual to maintain the reduced brake cylinder pressure against leakage.

*6. Graduated release lap position.* (Shown in Fig. 11.)—This position is due to the slight recoil above referred to or by the slight increase of auxiliary pressure over train pipe pressure, due to feeding the same from the supplementary reservoir. The slide valve 51 has remained stationary but the slide valve 50 has been moved sufficiently to blank the connection between the service brake cylinder port 33 and exhaust port 40, and also blank the supplementary reservoir port 38. All other ports remain blanked.

*7. Emergency position.* (Shown in Fig. 12.)—This position is assumed by the valve upon a large reduction in train pipe pressure which moves the main piston 5 fully over to the left, viewing Fig. 1, compressing the graduating spring 9. In this position the exhaust port 40 is blanked, as is also the port 48 leading to the reducing or blow-off valve. Both the brake cylinder port 33 and emergency brake cylinder port 34 as well as supplementary reservoir ports 37 and 38 are fully uncovered and consequently both brake cylinders are supplied with air from both the auxiliary and supplementary reservoirs. The cavity 62 in slide valve 51 also connects train pipe port 27 with emergency brake cylinder port 30 so that train pipe pressure can pass the check valve 29 and rush to the emergency brake cylinder. This flow of train pipe air continues until the brake cylinder pressure, plus the tension of the spring on check valve 29, overbalances train pipe pressure. Consequently, in an emergency application the brake cylinders are supplied with air from the train pipe during the earlier part of the application, thereby securing a quick serial action of the brakes throughout the train by a reduction of train pipe pressure at each car, but as soon as the brake cylinder pressure overcomes train pipe pressure the check valve 29 closes and thereafter the application is completed by the equalization of the auxiliary and supplementary reservoir pressures with the service and emergency brake cylinders. The emergency position of the valve can be secured either directly from the full release position, or from any of the other positions of the valve, by merely reducing the train pipe pressure below the point of equalization of the auxiliary reservoir pressure with the brake cylinder. The connection of port 30 with the emergency brake cylinder connection 35 is of importance when it is desired to make an emergency application after a service application, as it insures the train pipe port 27 being connected by cavity 62 to an empty brake cylinder, and thereby insures the local venting of the train pipe and the quick serial movement of the valves to emergency position throughout the train. In the event valve 51 does not have the prolongation indicated by the dotted lines 58, the supplementary reservoir port 38 will be uncovered in full release and graduated release positions thereby securing a direct charging of the supplementary reservoir through this port, and making unnecessary the connection 21 shown on Fig. 4 between the auxiliary and supplementary reservoirs. The prolongation 58 of the extension 57 prevents the supplementary reservoir pressure from building up the auxiliary reservoir pressure when the valve moves from service lap or full service position to full release position, hence is of special importance in case the valve is not desired to have any graduated release position.

The valve described has all of the usual functions of triple valves, including a quick service or serial venting position to secure the rapid serial action of the brakes throughout the train in both service and emergency applications, and also the graduated release of the brakes, and means for maintaining the pressure in the service brake cylinder during service applications from the supplementary reservoir, in addition to the usual service and emergency applications. The valve, therefore, performs all of the functions of the most approved triple valves but by a mechanical construction which is much simpler and less complicated than existing valves which perform all of the functions of this valve, so that the valve is not only cheaper in first cost, but is more reliable in action, less liable to get out of repair, cheaper in its upkeep, and offers less resistance to movement than similar valves for securing the same functional effects.

The brake cylinder pressure maintenance feature during service application is in no way dependent upon the use of an emergency brake cylinder, and such pressure maintenance feature can be used in a triple valve of the construction described which omits the emergency brake cylinder port and the parts coöperating therewith.

What I claim is:

1. In a fluid pressure brake, the combination of a valve device having connections to the train pipe, brake cylinder and auxiliary reservoir and operating by variations in train pipe pressure, and a supplementary valve device comprising a movable abutment open on one side to the brake cylinder, connections whereby when the primary valve device connects the auxiliary reservoir to the brake cylinder air is admitted to the opposite side of said movable abutment equal to the brake cylinder pressure, a check valve controlling the connection between a source of fluid pressure and the brake cylinder and arranged to be unseated by the movable abutment when pressure on the brake cylinder side thereof falls, and a second valve actuated by said movable abutment and arranged to close the connection from the source of fluid pressure to the brake cylinder when the latter is exhausted.

2. In a fluid pressure brake, the combination of a valve device having connections to the train pipe, brake cylinder, auxiliary reservoir and supplementary reservoir and operating by variations in train pipe pressure, and a supplementary valve device comprising a movable abutment open on one side directly to the brake cylinder and on its opposite side to the brake cylinder past a check valve, said movable abutment being arranged to control the exhaust from the last named side of said supplementary movable abutment upon exhaustion of brake cylinder pressure, and a check valve controlling communication between the supplementary reservoir and the brake cylinder and arranged to be unseated by the movable abutment when pressure on the brake cylinder side thereof falls.

3. In a fluid pressure brake, the combination of a valve device having connections to the train pipe, brake cylinder, auxiliary reservoir and supplementary reservoir and operating by variations in train pipe pressure, and a supplementary valve device comprising a movable abutment open on one side directly to the brake cylinder and on its opposite side to the brake cylinder past a check valve, a check valve controlling communication between the supplementary reservoir and the brake cylinder and arranged to be unseated by the movable abutment when pressure on the brake cylinder side thereof falls, and a second valve actuated by said abutment and arranged to close communication from the supplementary reservoir to the brake cylinder when the latter is exhausted.

4. In a fluid pressure brake, the combination of a valve device having connections to a brake cylinder and to a source of fluid pressure and comprising a movable abutment open on one side directly to brake cylinder pressure and subject on its other side to a definite sealed pressure, and valve mechanism actuated by said movable abutment and arranged upon a fall of pressure on the brake cylinder side thereof to open communication from the source of fluid supply to the brake cylinder, upon equalization of pressure on opposite sides of said abutment to break said communication from the source of fluid supply to the brake cylinder, and upon exhaustion of pressure from the brake cylinder side of said abutment to close communication from the source of fluid supply to the brake cylinder, said movable abutment being arranged to exhaust the sealed pressure from one side thereof when the brake cylinder is exhausted.

5. In a fluid pressure brake, the combination of a valve device having connections to the brake cylinder and to a source of fluid pressure and comprising a movable abutment open on one side to brake cylinder pressure and on its opposite side to a definite sealed pressure, a check valve controlling communication between a source of fluid pressure and a brake cylinder and being seated when pressures on opposite sides of the abutment are equal and arranged to be unseated by the movable abutment when pressure on the brake cylinder side thereof falls, a valve carried by the movable abutment and arranged to close communication from the source of fluid pressure to the brake cylinder when the pressure on the brake cylinder side of the movable abutment is exhausted, and an exhaust connection for the sealed pressure acting against the movable abutment arranged to be open when the pressure on the brake cylinder side of said movable abutment is exhausted.

6. In a fluid pressure brake, the combination of a valve device having connections to the atmosphere, train pipe, brake cylinder and auxiliary reservoir and including a movable abutment actuated by variations in train pipe pressure, ports and passages controlled by said movable abutment and arranged upon reduction of train pipe pressure to open communication from the auxiliary reservoir to the brake cylinder, a supplementary valve device, connections from a source of fluid supply to said supplementary valve device, connections from brake cylinder directly to one side of a supplementary movable abutment and past a check valve to the opposite side of said supplementary movable abutment, connections between said supplementary movable abutment and said supplementary valve device whereby when the valve device is in service lap position said supplementary valve device establishes communication between a source of fluid pressure and the brake cylinder upon diminution of brake cylinder pressure, and an exhaust connection from the check-valve-controlled side of said supplementary movable abutment controlled by said supplementary movable abutment.

7. In a fluid pressure brake, the combination of a valve device having connections to the atmosphere, train pipe, brake cylinder and auxiliary reservoir and including a movable abutment actuated by variations in train pipe pressure, a supplementary valve device including a movable abutment open on one side directly to the brake cylinder and on its opposite side to the brake cylinder past a check valve, a valve actuated by said supplementary movable abutment and controlling communication between a source of fluid pressure and the brake cylinder, ports and passages controlled by the primary movable abutment and arranged upon reduction of train pipe pressure to connect the auxiliary reservoir to the brake cylinder, and connections from a source of fluid pressure to said supplementary valve device, whereby upon diminution of brake cylinder pressure the supplementary movable abutment actuates the supplementary valve device to open communication from the source of fluid pressure to the brake cylinder, and an exhaust connection from the check-valve-controlled side of said supplementary movable abutment controlled by said supplementary movable abutment.

8. In a triple valve, a valve seat provided with a port communicating with the brake cylinder and having a connection therefrom to a supplementary valve device, a port communicating with a supplementary reservoir and communicating with said supplementary valve device, and a valve coöperating with said seat and arranged in service position to connect the auxiliary reservoir to the brake cylinder port and in service lap position to blank said brake cylinder port, in combination with a supplementary valve device comprising a movable abutment open on one side directly to said brake cylinder connection and on its opposite side to said brake cylinder connection past a check valve and controlling the exhaust from the last named side, and a valve actuated by said supplementary movable abutment and controlling communication between the supplementary reservoir connection to the brake cylinder connection.

9. In a triple valve, a valve seat provided with a port communicating with the brake cylinder, an exhaust port in proximity thereto, a second port communicating with said brake cylinder, a port in proximity thereto communicating with a reducing valve, a small port communicating with the train pipe, a small port in proximity thereto and communicating with another small port in proximity to the first named brake cylinder port, a pair of valves coöperating with said seat and having movement relative to each other, one of said valves being arranged in release position to connect the first named brake cylinder port with the exhaust port and upon diminution of train pipe pressure to first connect the small train pipe port with the first named brake cylinder port and then uncover said brake cylinder port, and the other of said valves being arranged in full release position to connect the small train pipe port with the release port in proximity thereto and upon service reduction of train pipe pressure to connect the second brake cylinder port with the reducing valve port.

10. In a triple valve, a valve seat provided with a port communicating with a service brake cylinder, a port communicating with an emergency brake cylinder, an exhaust port in proximity to said brake cylinder ports, a pair of ports communicating with a supplementary reservoir and communicating with a brake cylinder pressure maintenance valve, and a pair of valves coöperating with said seat and having movement relative to each other, one of said valves being arranged in full release position to connect both brake cylinder ports with the exhaust port, in service position to uncover the service brake cylinder port and blank the exhaust port and one of said supplementary reservoir ports, and in emergency position to uncover both of said brake cylinder ports and said supplementary reservoir ports, and the other valve being arranged in emergency position to uncover the second supplementary reservoir port.

11. In a triple valve, a valve seat provided with a port communicating with a service brake cylinder, a port communicating with an emergency brake cylinder, a port communicating with the train pipe, an exhaust port in proximity to said brake cylinder ports, a pair of ports communicating with a supplementary reservoir and communicating with a brake cylinder pressure maintenance valve, and a pair of valves coöperating with said seat and having movement relative to each other, one of said valves being arranged in full release position to connect both brake cylinder ports with the exhaust port, in service position to uncover the service brake cylinder port and blank the exhaust port and one of said supplementary reservoir ports, and in emergency position to uncover both of said brake cylinder ports and said supplementary reservoir ports, and the other valve being arranged in emergency position to uncover the second supplementary reservoir port and connect the train pipe port with the emergency brake cylinder.

12. In a triple valve, a valve seat provided with a service brake cylinder port, an emergency brake cylinder port, a train pipe port, and an exhaust port, and valve mechanism coöperating with said seat and arranged in full release position to connect both brake cylinder ports with the exhaust port, in service position to uncover the service brake cylinder port, and in emergency position to uncover the service brake cylinder port and connect the train pipe and emergency cylinder ports.

In testimony whereof, I have hereunto set my hand.

JACOB RUSH SNYDER.

Witnesses:
 WM. P. LACKIN,
 MARY E. CAHOON.

---

Copies of this patent may be obtained for five cents each, by addressing the "Commissioner of Patents, Washington, D. C."